United States Patent [19]

Borchard

[11] Patent Number: 5,167,290

[45] Date of Patent: Dec. 1, 1992

[54] SPRINGS FOR USE IN A COMPACT SELF-ADJUSTING WEIGHING SYSTEM

[76] Inventor: John Borchard, 97A Lowell Ave., Newton, Mass. 02160

[21] Appl. No.: 587,109

[22] Filed: Sep. 24, 1990

[51] Int. Cl.⁵ ............................ G01G 3/00; G01G 3/14
[52] U.S. Cl. .............................. 177/225; 177/210 C
[58] Field of Search ............................ 177/225, 210 C

[56] References Cited

U.S. PATENT DOCUMENTS

| | | | |
|---|---|---|---|
| 2,087,354 | 7/1937 | Muffly | 177/225 |
| 3,565,195 | 2/1972 | Miller et al. | |
| 3,831,688 | 8/1974 | Phipps | 177/225 X |
| 4,266,263 | 5/1981 | Haberl et al. | |
| 4,295,379 | 10/1981 | Zura | 177/225 X |
| 4,463,614 | 8/1984 | Lee | |
| 4,482,022 | 10/1984 | Komoto | |
| 4,572,006 | 2/1986 | Wolfendale | |
| 4,585,082 | 4/1986 | Harrington et al. | 177/210 C |
| 4,629,019 | 12/1986 | Harrington et al. | 177/210 C |
| 4,738,324 | 4/1988 | Borchard | |
| 4,799,558 | 1/1989 | Griffen | |
| 4,825,967 | 5/1989 | Sakamoto et al. | |
| 4,828,057 | 5/1989 | Borchard | |
| 4,862,978 | 9/1989 | Borchard | |
| 4,862,979 | 7/1989 | Borchard | |
| 4,869,331 | 9/1989 | Borchard | |
| 4,874,051 | 10/1989 | Borchard | |
| 4,913,248 | 4/1990 | Zakai | |
| 4,960,177 | 10/1990 | Holm-Kennedy et al. | |
| 4,964,478 | 11/1990 | Stadler et al. | |

*Primary Examiner*—George H. Miller, Jr.
*Attorney, Agent, or Firm*—Hale and Dorr

[57] ABSTRACT

Springs for use in a weighing system for measuring gems and other very light masses. A pan and sensor assembly is used in which the springs are sandwiched between the plates of the sensor assembly. The springs have a generally conic cross-section and include holes for releasing air pressure when the pan and sensor assembly is compressed. In a preferred embodiment, grooves are provided in the surface of the springs which allow the springs to compress, in a bellows or accordion-like fashion, substantially parallel to a central axis. One large spring or a plurality of springs may be used in a weighing system. The weighing system uses three or more transducers about the pan to measure the weight of the mass, and correlates the values measured by each transducer for a given mass, at given locations, to arrive at a true weight value for the mass in spite of its potentially off-center location on the system's holding pan.

17 Claims, 7 Drawing Sheets

SPRINGS FOR USE IN A COMPACT SELF-ADJUSTING WEIGHING SYSTEM

BACKGROUND OF THE INVENTION

1. Field of the Invention

The present invention relates generally to the field of measuring apparatus for light masses. More particularly, the present invention relates to springs used in a compact electronic balance capable of correcting an error in the measured value due to off-center placement of the mass to be weighed.

2. Discussion of the Prior Art

There are many ways to measure weight. One problem that all weighing apparatus face is that of off-center pan loading in which the mass to be weighed is not located at the exact center of the weighing pan, but is off to one side. In general, when a load is placed deviatedly from a required point of placement, such as the center of the pan, the bending moment exerted on the pan thereby produces an error in the measured value. Until recently, there were two basic ways of handling the problem of off-center pan loading: the "hanging pan" and the "parallel-motion" techniques. The "hanging pan" technique consists of a pan suspended from a knife edge support at a single point, such that gavity will twist the pan so as to locate its center of gravity directly below the pan support. This prevents bending moments in the load sensing mechanism. With the "parallel-motion" technique, a parallel-motion linkage is attached to the pan. This absorbs the bending moment caused by off-center loading and prevents bending moment forces from being applied to the load cell.

The hanging pan technique is mechanically simple with a simple sensor. It has a very tall vertical scale dimension, but no adjustments for off-center loading are required. However, friction at the knife-edge and overall inertia are sources of error when weighing very light masses. Devices constructed in accordance with this technique tend to be bulky, and the pan's hanger is often in the way when loading. Levelling of the overall device is important.

Devices constructed in accordance with the parallel-motion technique are mechanically complex. They are top-loading and have a thick, but simple sensor. The vertical scale dimension is less than that of a hanging pan but is still substantial. Adjustment for off-center loading is required through mechanical adjustments of the linkage. Misadjustment of the linkage is a common source of error. Levelling of the device is very important.

U.S. Pat. No. 4,738,324 to Borchard, the specification of which is hereby incorporated by reference, discloses a third, improved way of handling the problem of off-center pan loading. The technique of that system is a self-adjusting one in which the effects of off-center loading in the load cell are measured and corrected before the weight reading is outputted. The device constructed in accordance with that technique measures deflections at a plurality of locations on a spring-supported pan, and combines the separate measurements to yield the weight on the pan, corrected for load placement location, i.e., off-center loading. The deflection measurements are accomplished using a plurality of capacitors formed between two rigid, closely-spaced plates with pie-shaped patterns on the plates forming the capacitors. These are not actually three separate capacitors, but one device acting like three different capacitors and/or performing as if it were three separate capacitors. The plates are glued to the weight bearing pan and a base. The plates are held apart by one or more leaf springs spaced around the periphery of the plates. When an object to be weighed is placed on the weighing pan, circuitry converts the capacitance measured for each capacitor into a frequency that is then used in conjunction with preset adjustment factors, to determine the weight of the object and to compensate for any off-center loading of the weighing pan.

Although the system of the '324 patent provided numerous advantages over the prior art, it required careful assembly to form the three leaf springs which created the displacement between the plates. Additionally, having the three leaf springs protruding from the periphery of the plates resulted in an assembled pan and sensor assembly that was relatively large. Other examples of prior art leaf springs for use in scales for weighing light masses may be seen in U.S. Pat. Nos. 4,828,057; 4,869,331; and 4,874,051.

In the arrangement of the '324 pan and sensor assembly, the gap between the plates is a function of both the thickness of the disks and the opening in the springs. Therefore, thermal expansion of the disks and changes in the spring temperature can cause significant changes in the dimension of the gap separating the plates thus adversely affecting measurement accuracy and particularly requiring extended periods of time to allow the pan and sensor assembly to stabilize after being subjected to a change in temperature.

Other aspects of prior art weighing systems may be seen in U.S. Pat. Nos. 4,862,978 and 4,862,979.

Therefore, an object of the present invention is to provide an improved version of the '324 weighing system which has a more compact construction.

Another object of the present invention is to provide a weighing system using a pan and sensor assembly that can be manufacture using simpler assembly techniques than in the prior art.

Yet another object of the present invention is to provide springs for use in a balance having improved temperature characteristics and having a more compact construction than the springs of the prior art.

SUMMARY OF THE INVENTION

The foregoing and other objects, features, and advantages of the present invention are achieved in a compact self-adjusting weighing system that accurately compensates for off-center pan loading. The pan and sensor assembly includes a plurality of capacitors formed between two rigid, closely-spaced plates with specific patterns on the plates forming the capacitors.

The plates of the pan and sensor assembly are held apart by springs disposed between the plates. In a preferred embodiment, the springs do not extend beyond the outer peripheral edges of the plates in any dimension. In one embodiment, a plurality of springs having a conic cross-section is used. In another embodiment, one large toroidal spring is used. The springs are provided with holes, slots, etc. for releasing air pressure when the pan and sensor assembly is compressed. The surface of the springs is provided with grooves, wrinkles, corrugations, or the like which allow the springs to compress, in a bellows or accordian-like fashion, substantially parallel to a central axis.

The foregoing and other objects, features, and advantages of the present invention will be more readily understood and apparent from the following detailed description of the invention, which should be read in conjunction with the accompanying drawings, and from the claims which are appended at the end of the detailed description.

DETAILED DESCRIPTION

Figure 1:
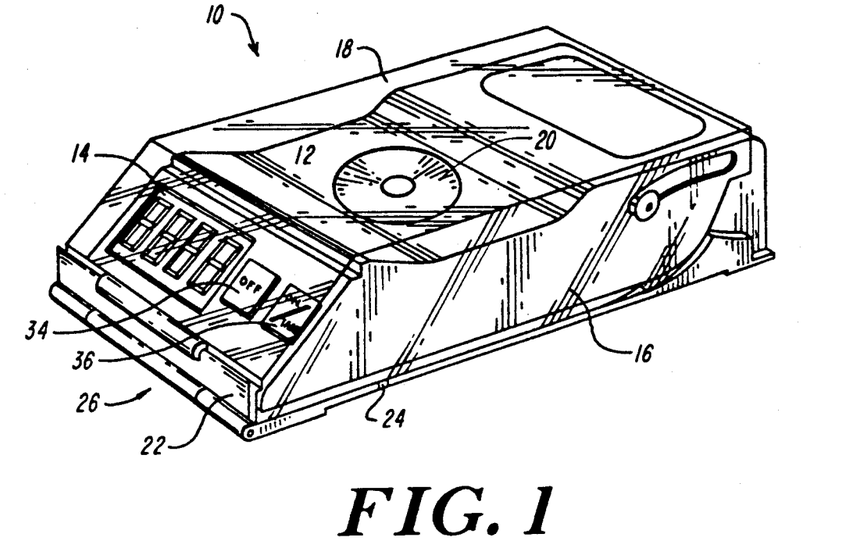
FIG. 1 is a perspective view of a weighing system constructed in accordance with the present invention.
Figure 2:
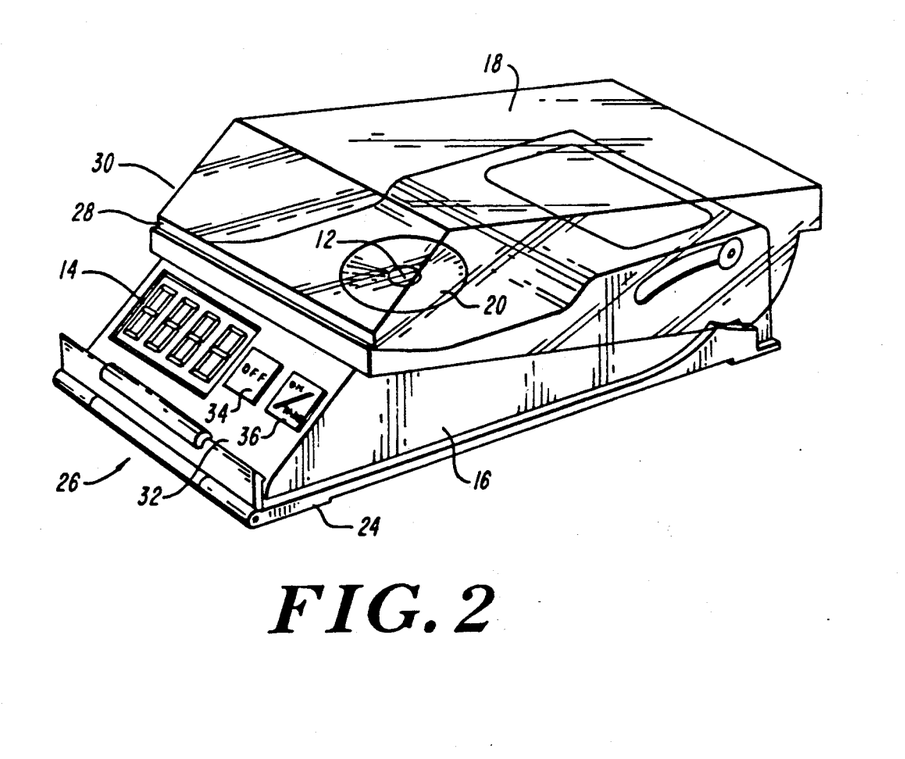
FIG. 2 shows the invention of FIG. 1 in use.

Referring now to the drawings in detail, wherein like numerals refer to like elements, reference numeral 10 refers generally to a weighing system, including a preferred embodiment of the present invention. This embodiment of the invention is a self contained scale for accurately measuring the weight of gems or other very light masses 12. The scale 10 provides a digital reading on an LCD display 14 of the weight of the item 12 being weighed. The scale 10 is enclosed within a casing 16 and has over its top, front, and sides a transparent dust cover 18 which may be completely opened, exposing a weighing platform or pan 20 upon which the mass 12 to be weighed is placed. The dust cover 18 is held in the fully closed position by mean of a spring latch 22 pivotally attached to the casing bottom 24 at the casing front 26. The latch 22 hooks onto a horizontal notch 28 in the front portion 30 of cover 18. The casing front 26 also contains a keyboard 32 with two keys 34 and 36. The OFF key 34 shuts the scale 10 off. The ON/TARE key 36 turns the system power on and performs a TARE function which is a zeroing function compensating for possible drift in null weight, pan weight, dust, etc.

Figure 3:
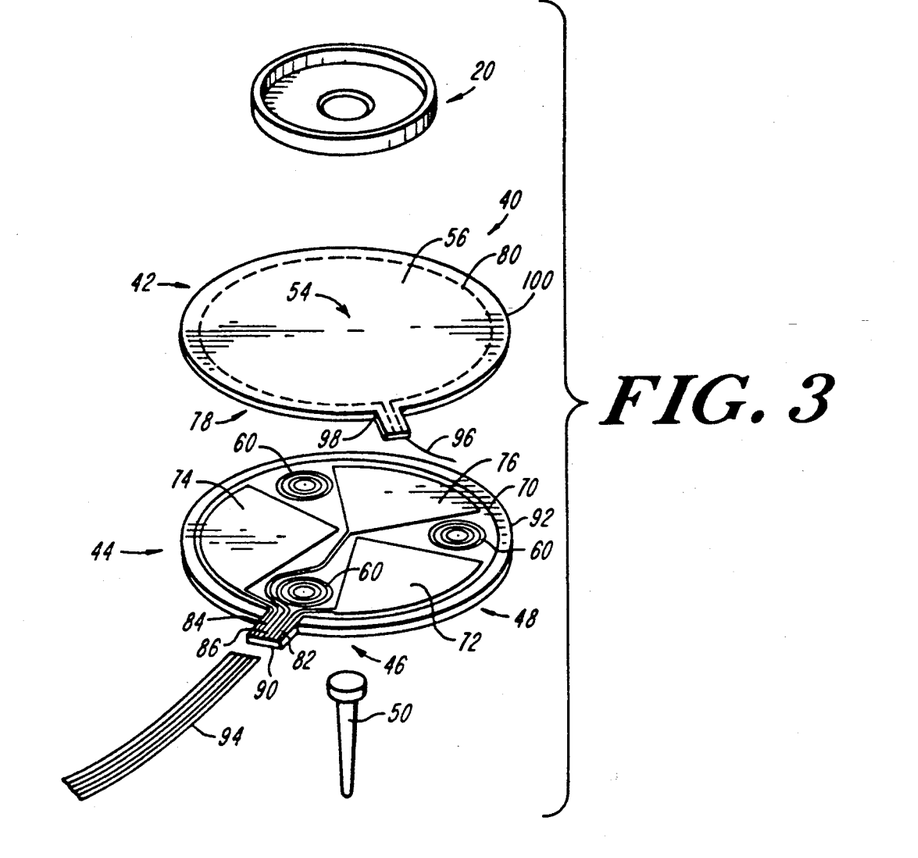
FIG. 3 is a perspective exploded view of an unassembled pan and sensor assembly used in the weighing system of FIG. 1.
Figure 4:
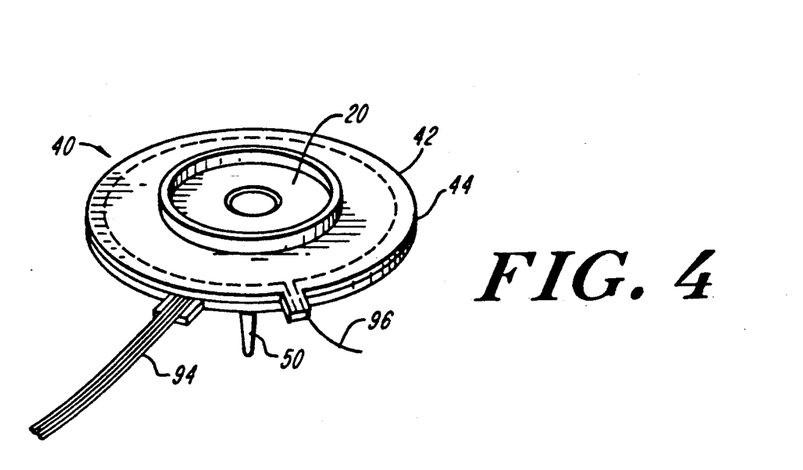
FIG. 4 is a perspective view of the assembled pan and sensor assembly of FIG. 3.
Figure 5:
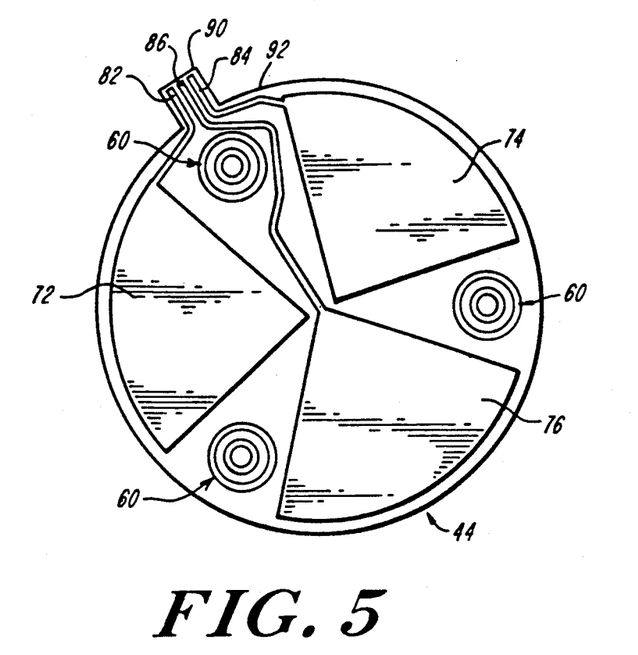
FIG. 5 is a plan view of a portion of the sensor assembly illustrated in Figs. 3 and 4.

Reference is now made to FIGS. 3-5, which show the pan and sensor assembly 40 in detail. The pan and sensor assembly 40 includes two flat, rigid, nonconductive plates, 42 and 44, disposed facing each other about a central axis. Extending vertically downward from the center 46 of the bottom face 48 of the bottom plate 44 is a rigid member or pin 50. One end of rigid member 50 is fixedly attached to the center 46 of plate 44 and the other end of rigid member 50 is fixedly attached to a printed circuit board containing the scale s electronics located on the casing bottom 24 or to the casing bottom 24 itself as described in the '324 patent. Either may act as a base for the pan and sensor assembly 40. A weighing pan 20 is mounted to the center 54 of side 56 of plate 42. Any off-center placement of the mass 12 to be weighed in the weighing pan 20 is translated into a downward force and also into a predictable plate tipping movement, thereby allowing the invention's computer to compensate for any tendency of the pan 20 to tip due to off-center placement of the mass 12 to be weighed. Since bottom plate 44 and pin 50 are fixedly attached to either the printed circuit board or casing bottom, the bottom plate 44 provides a flat, rigid point of reference for the tipping movement of the pan 20 and the upper plate 42.

The bottom plate 44 is made of nonconductive material but has a specific pattern of conductive material silkscreened onto its nonglued facing side 70, consisting of three, separate, symmetrical, roughly pie-shaped regions 72, 74, and 76 in a preferred embodiment. The centers of conductive regions 72, 74 and 76 are spaced approximately 120° from each other on the surface 70. The top plate 42 is also made of a nonconductive material. Its nonglued facing side 78 has a solid, 360° conductive region 80 silkscreened on. In effect, the two plates 42 and 44 form three capacitor sensors $S_1$, $S_2$, and $S_3$. Sensor $S_1$ is formed by conductive region 80 and conductive region 72. Sensor $S_2$ is formed by conductive region 80 and conductive region 74. Sensor $S_3$ is formed by conductive region 80 and conductive region 76. The respective electrical connections 82, 84, and 86 for conductive regions 72, 74, and 76 on lower plate 44 are brought out to one portion 90 on the lower capacitor plate's periphery 92. Cable 94 is connected to conductors 82, 84, and 86 at portion 90. The electrical connection for upper plate 42 is made to conductor 96 at portion 98 disposed along the outer periphery 100 of plate 42.

Plates 42 and 44 are separated from each other by force exerted by springs 60. In a preferred embodiment, springs 60 do not extend beyond the outer peripheries of plates 42 and 44 in any dimension. Springs 60 are disposed approximately 120° from each other between respective conductive regions 72, 74, and 76 on the surface 70. As will be explained in greater detail hereinafter, springs 60 are attached to surface 70 of plate 44 and surface 78 of plate 42.

Figure 6A:
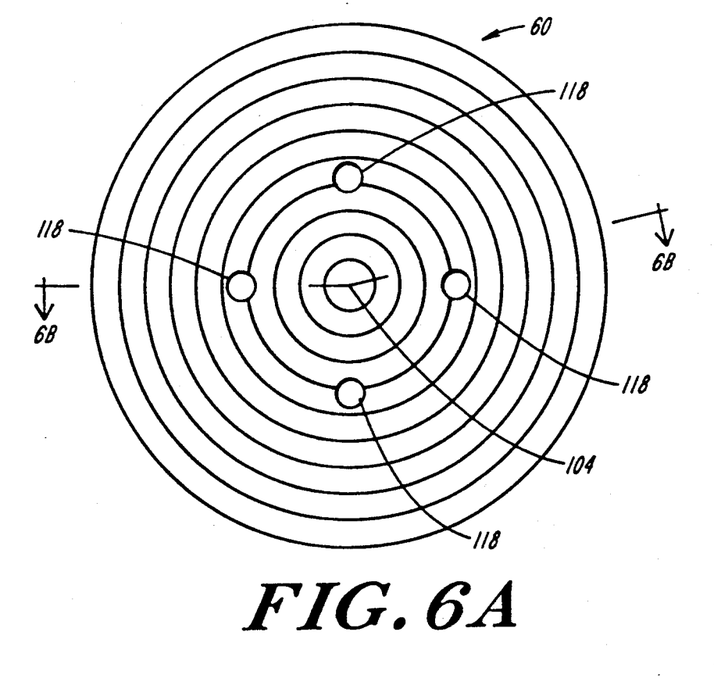
FIGS. 6A, 6B, and 6C include plan and cross sectional views of the springs used in the pa and sensor assembly illustrated in FIGS. 3, 4, and 5.
Figure 6B:
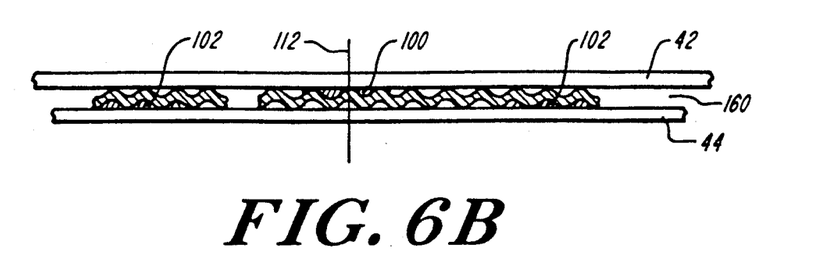
Figure 6C:
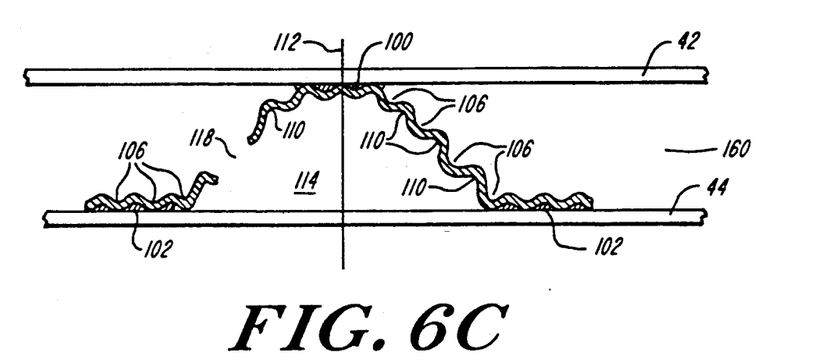

Reference is now made to FIGS. 6A, 6B, and 6C which figures show a preferred embodiment of the springs 60. The springs 60 are generally circular in shape as shown in FIG. 6A. Referring to FIG. 6C, springs 60 have a generally conic or frusto-conic cross section. Springs 60 are attached to top plate 42 and bottom plate 44 at locations 100 and 102. Springs 60 may be attached to the plates 42 and 44 by using any appropriate method, such as gluing or soldering. Springs 60 are provided, in a preferred embodiment, with grooves which are located in the surface of the spring and are generally concentrically oriented around the center 104 of springs 60. Grooves 106 may be circular, concentric, and separate, or may be a single spiral or multiple spirals about center point 104. Springs 60 may be made of any suitable material such as stainless steel foil or the like.

FIG. 6C is a cross section along line 6B—6B in FIG. 6A and illustrates springs 60 in their rest or uncompressed state. FIG. 6B is also a cross section along line 6B—6B in FIG. 6A and illustrates springs 60 when a gem or other weight has been placed in the weighing pan 20. As springs 60 begin to compress under the weight of the object, grooves 106 allow portions 110 of the spring to begin to move toward each other in a bellows or accordion-like fashion along line 112 so that top plate 42 may approach bottom plate 44 without any lateral shifting occuring between the plates. The volume 114 contained between springs 60 and bottom plate 44 is filled with air. If this air is not allowed to escape from the volume 114, springs 60 will not be able to compress smoothly and completely under the weight of an object in weighing pan 20. Therefore, springs 60 are provided with holes 118 located approximately 90° apart about the center 104 in a preferred embodiment. As springs 60 are compressed, the holes 118 allow air pressure to escape, thus allowing proper and even compression of springs 60.

In the reverse situation, when an item is removed from weighing pan 20, holes 118 allow air to re enter volume 114, thus allowing springs 60 to properly expand, avoiding any vacuum effects. Although holes 118 have been illustrated 90° apart in springs 60, any number of holes of an appropriate shape may be used to achieve the desired air exchange between volume 114 and the surrounding air depending upon the spring performance characteristics desired.

Although holes 118 have been illustrated as circular openings, this is not a requirement. For example, holes 118 may be elongated slots extending radially from center point 104. Holes 118 may also be elongated slots extending circumferentially about center point 104. Holes 118 may be any appropriate shape that achieves the desired air exchange. Additionally, although springs 60 have been illustrated as having grooves which allow the springs to compress in an accordion-like or bellows fashion, one skilled in the art will appreciate that the invention comprehends a number of other shapes that produce the same effect. For example, the surface of springs 60 may be corrugated or wrinkled, randomly as well as in a symmetrical pattern.

Figure 7:
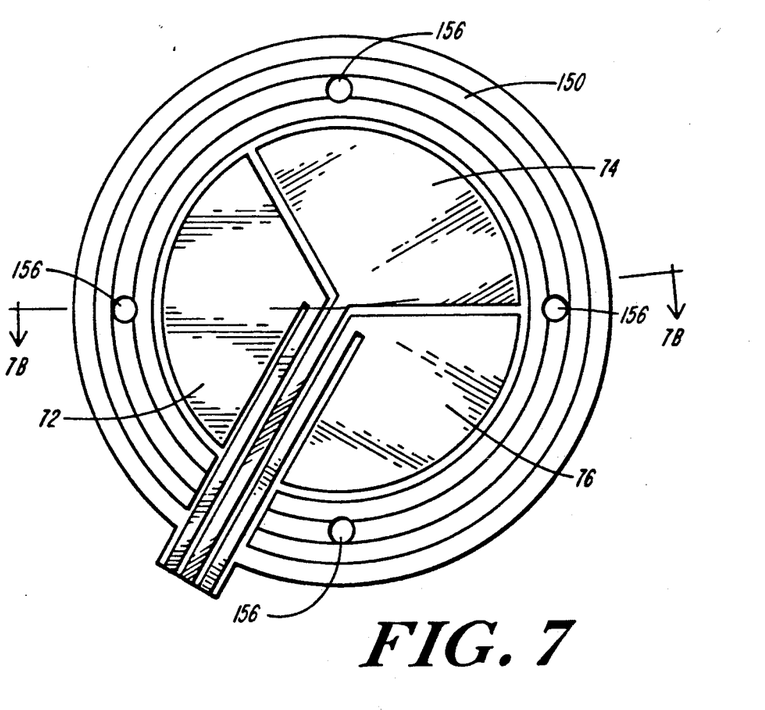
FIG. 7A, 7B, and 7C illustrate, in plan and cross sectional views, an alternate embodiment of the springs used in the pan and sensor assembly of FIGS. 3 and 4.
Figures 7B, 7C:
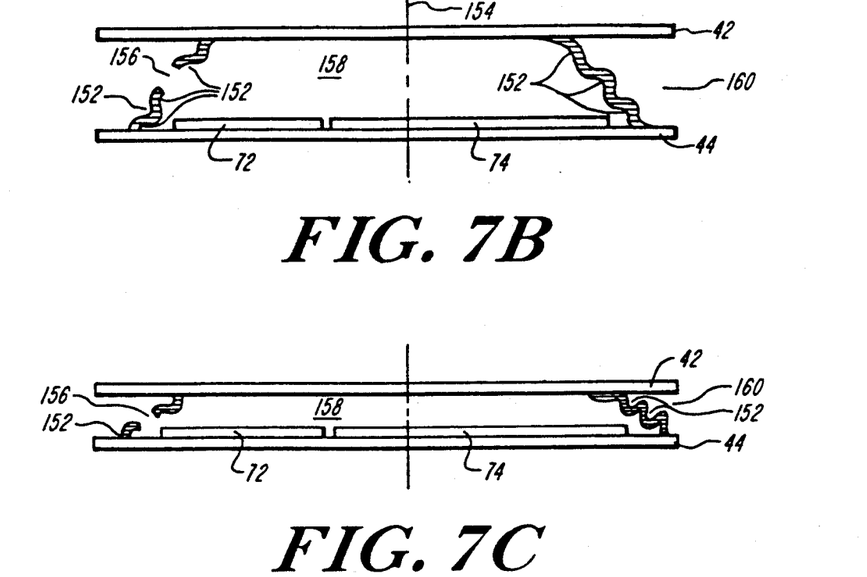

Reference is now made to FIG. 7, which figure illustrates an alternate embodiment of the springs used to separate plates 42 and 44.

Referring to FIG. 7A in detail, like elements have been given like reference numerals. Rather than using three separate springs of a small size as illustrated in FIGS. 5 and 6, the construction of FIG. 7 uses one large annular or toroidal shaped spring 150 having a generally conical cross section disposed about the periphery 92 of bottom plate 44. Conductive regions 72, 74, and 76 which are 120° pie-shaped regions in this embodiment are contained within toroidal spring 150.

FIG. 7B is a cross section along line 7B—7B of FIG. 7A, and illustrates spring 150 in its uncompressed state, while FIG. 7C is also a cross section along line 7B—7B of FIG. 7A, and illustrates spring 150 in its compressed state. The operation of toroidal spring 150 will now be explained. Toroidal spring 150 is provided with grooves 152 similar to grooves 106 of springs 60. Grooves 152 may be concentric grooves or may be a single spiral or may be any other shape that allow smooth compression of spring 150. When a gem or other item to be weighed is placed on weighing pan 20, the force exerted on upper plate 42 compresses spring 150. Grooves 152 allow spring 150 to compress in a bellows or accordion like fashion along line 154 to a position indicated by FIG. 7C without any lateral shifting occuring between plates 42 and 44. Holes 156, of a number and configuration necessary to provide the desired spring performance, are included in toroidal spring 150 to allow air to escape from volume 158 enclosed between spring 150, plate 42, and plate 44. Although spring 150 has been shown as one continuous large spring, this is not a requirement. A number of springs may be provided around the periphery of plate 44 such that the plurality of springs has an overall conic or frusto-conic shape as in spring 150.

Figure 8:
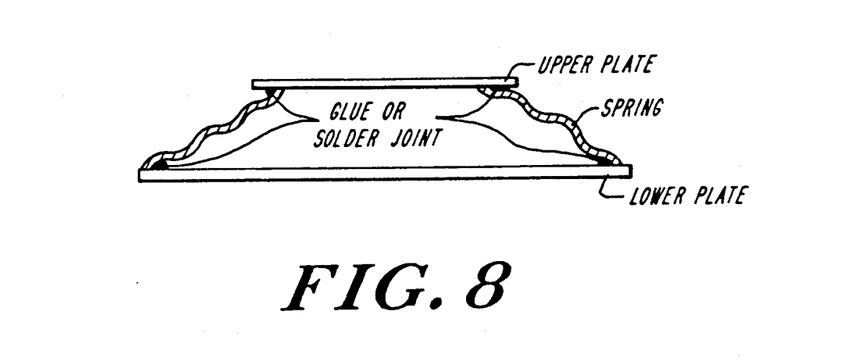
FIG. 8 is a cross section of a further embodiment of a spring according to the present invention.
Figure 9:
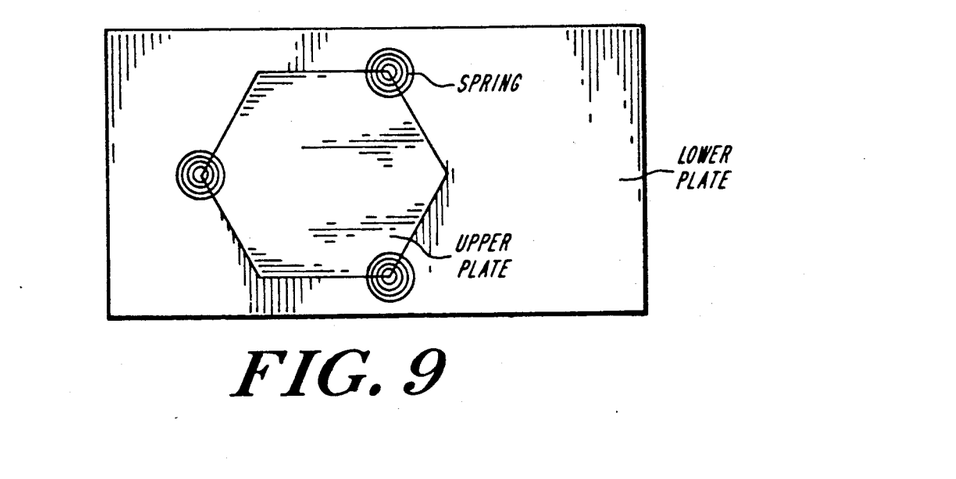
FIG. 9 shows in plan view a further embodiment of the plate and sensor assembly of the present invention.
Figure 10:
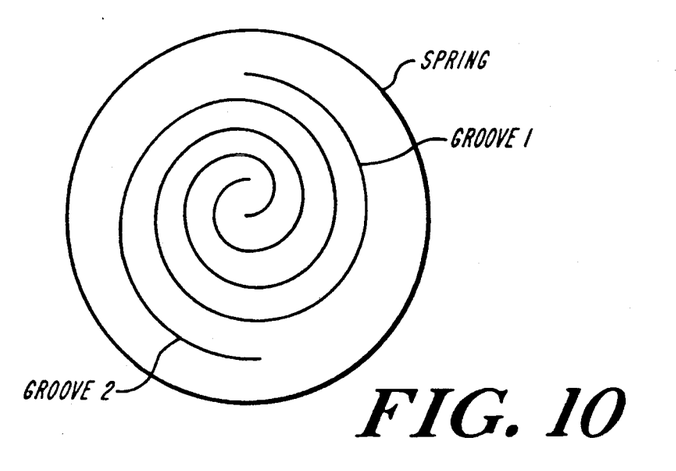
FIG. 10 shows a plan view of a spring as shown in FIGS. 6A-6C but having multiple grooves or corrugations.
Figure 11A:
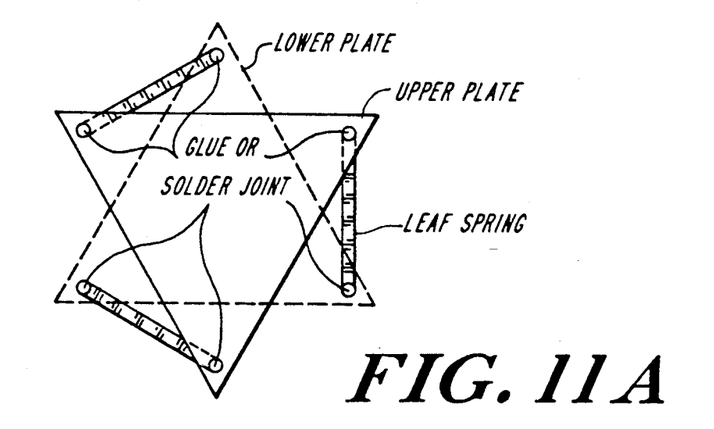
FIGS. 11A and 11B illustrate a plate and sensor assembly using leaf springs according to the present invention.
Figure 11B:
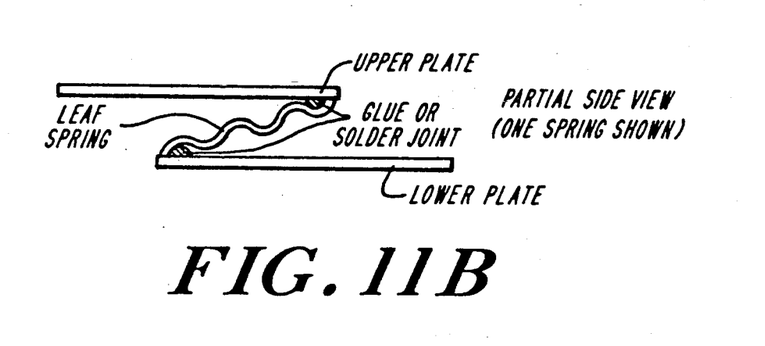
Figure 12A:
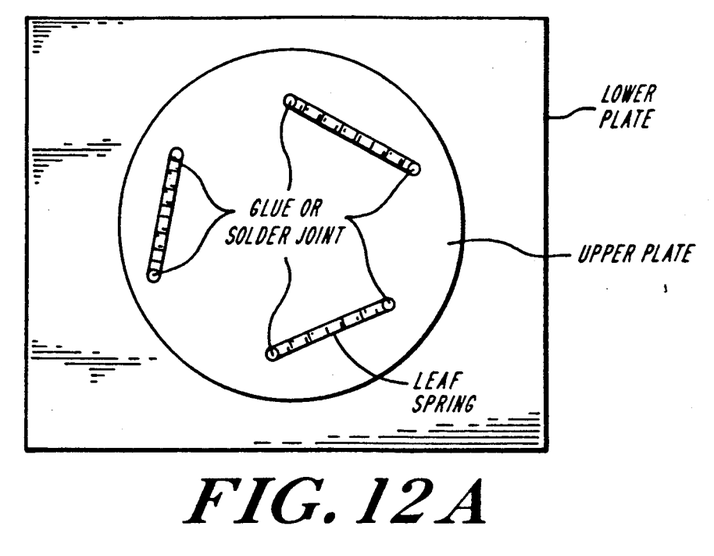
FIGS. 12A and 12B illustrate a further plate and sensor assembly using leaf springs according to the present invention.
Figure 12B:
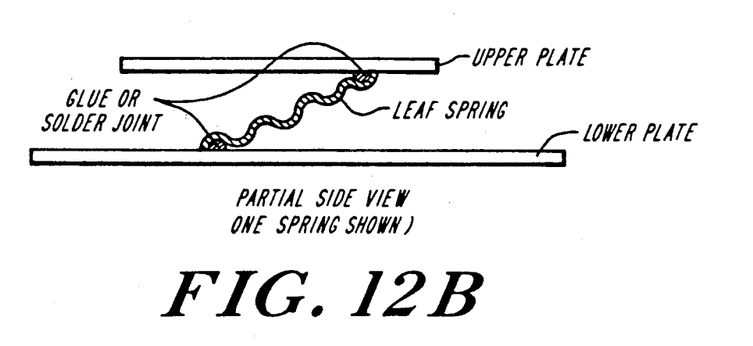
Figure 13A:
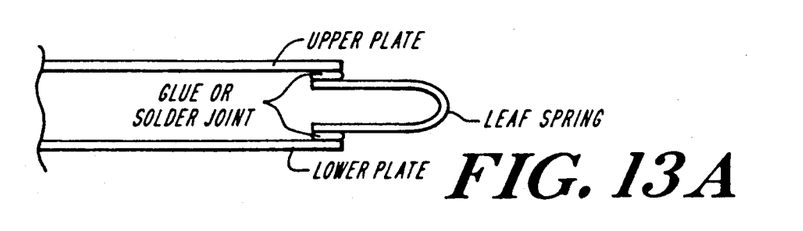
FIG. 13A and 13B illustrate leaf springs attached to the facing surfaces of the plates according to the present invention.
Figure 13B:
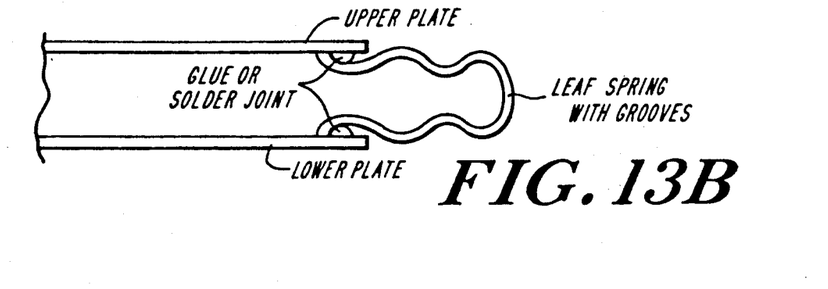

Other embodiments of springs comprehended by the present invention are illustrated in FIGS. 8-13. FIG. 8 shows in cross section a spring as illustrated in FIGS. 7A-7C except that the upper and lower plates are not the same size and therefore the spring extends beyond an outer peripheral edge of at least one plate. FIG. 9 shows in plan view the spring illustrated in FIGS. 6A-6C except that the springs extend beyond an outer peripheral edge of at least one plate as well. FIG. 10 illustrates a plan view of a spring as shown in FIGS. 6A-6C but having multiple grooves or corrugations for allowing compression without lateral movement. FIGS. 11-13 illustrate a leaf spring embodiment of the present invention. The leaf springs are attached to the facing surfaces of the capacitor plates and include grooves, corrugations, or wrinkles to provide for compression of the capacitor plates without allowing any lateral movement between the plates. FIGS. 8-13 also illustrate alternate shapes of the upper and lower plates in accordance with the present invention.

Locating the springs 60 or 150 sandwiched between the plates 42 and 44 provides several advantages. First, temperature effects are improved, since thermal expansion of the disks has a negligible effect on the gap 160 between plates 42 and 44. In the leaf springs used in the system of the '324 patent, the gap is a function of both the thickness of the disks and the opening in the springs. Since the total change in the gap is small, any extraneous change in the gap between plates 42 and 44 will introduce an error into the final weight measurement. In the present invention, even if the thickness of the plates 42 and 44 were to vary, due to temperature changes, the actual spacing between the plates would not change. Thus, the present invention removes a source of error present in the '324 system.

The present invention also provides for simpler assembly and manufacturing of the pan and sensor assembly 40. In the '324 system, three separate leaf springs have to be formed from strips extending from the top pan 20 and then welded or soldered onto the peripheral surface of a bottom pan. In the present invention, the springs can be formed such that they are connected together with a perforated tear off tab. The tear-off tab may be used to locate the springs relative to the conductive regions 72, 74, and 76 on surface 70. Attachment of the springs to the plates can be accomplished by passing the assembly through a solder reflow oven. Alternatively, glue may be applied to the springs and the tear-off tab may be used to locate the springs on the disk 44. Thereafter, when the springs are in place, the tear-off tab can simply be removed.

The springs 60 or 150 translate the weight of the object 12 being measured into a displacement between the plates 42 and 44. The three capacitors formed by the elements 80,72 and 80,74 and 80,76 are roughly 22 to 30 picofarads each, and are employed as sensors in which the weight applied against the sensor effects a change in capacitance which is converted by electronics to a frequency inversely proportional to the capacitance. Thus, electrical outputs are obtainable which are analogs of the weight of the object 12 being measured, the variation in values of each of the three capacitors 80,72 and 80,74 and 80,76 reflecting tipping from the position of the object 12 being measured on the pan 20 as well as its weight. In the present invention, perfect centering of the object 12 to be measured on the top pan 20 would mean nominally that the capacitance values for each of the capacitors 80,72 and 80,74 and 80,76 would be the same. However, the slightest deviation from perfect nominal centering means that the capacitance values for each capacitor will be different.

In accordance with the weighing system of the '324 patent, each of the capacitance values is selected sequentially and converted, using an integration type circuit, to create a frequency corresponding to the value registered by each capacitor/sensor. The frequencies may be then used to calculate the weight of object 12 using the method and apparatus described in the '324 patent.

Having thus described one particular embodiment of the invention, various alterations, modifications and improvements will readily occur to those skilled in the art. For example, the springs used to separate pans 42 and 44 can be of configurations other than those illustrated in FIGS. 6 and 7, depending upon the desired electrode pattern. In addition, bottom plate 44 and pin 50 may be eliminated and the springs 60, top plate 42, and weighing pan 20 may rest directly on the printed circuit board or substrate carrying the invention's electronics. Such alterations, modifications and improvements as are made obvious by this disclosure are intended to be part of this disclosure though not expressly stated herein, and are intended to be within the spirit and scope of the invention. Accordingly, the foregoing description is by way of example only, and is not intended as limiting. The invention is limited only as defined in the following claims and equivalents thereto.

What is claimed is:

1. A measuring apparatus for masses and forces, comprising:
    first plate means having a first outer peripheral surface for receiving a load to be weighed;
    a second plate means having a second outer peripheral surface, disposed below the first plate means; and
    at least one compression spring means for maintaining a separation between said first and second plate means, said spring means attached to said first and second plate means and not extending beyond said first or second outer peripheral surface in any dimension, said spring means being compressible along a direction substantially perpendicular to the plate means and said spring means comprising a plurality of grooves coaxially disposed about a central axis, said spring means allowing said first plate means to move toward and away from said second plate means while preventing all but minimal lateral shifting of said first and second plate means.

2. A measuring apparatus for masses and forces, comprising:
    first plate means having a first outer peripheral surface for receiving a load to be weighed;
    a second plate means having a second outer peripheral surface, disposed below the first plate means; and
    at least one compression spring means for maintaining a separation between said first and second plate means, said spring means attached to said first and second plate means and not extending beyond said first or second outer peripheral surface in any dimension, said spring means being compressible along a direction substantially perpendicular to the plate means and said spring means comprising at least one spiral groove, said spring means allowing said first plate means to move toward and away from said second plate means while preventing all but minimal lateral shifting of said first and second plate means.

3. A measuring apparatus for masses and forces, comprising:
    first plate means having a first outer peripheral surface for receiving a load to be weighed;
    a second plate means having a second outer peripheral surface, disposed below the first plate means; and
    at least one compression spring means for maintaining a separation between said first and second plate means, said spring means attached to said first and second plate means and not extending beyond said first or second outer peripheral surface in any dimension, said spring means being compressible along a direction substantially perpendicular to the plate means and said spring means comprising corrugation means, said spring means allowing said first plate means to move toward and away from said second plate means while preventing all but minimal lateral shifting of said first and second plate means.

4. A measuring apparatus for masses and forces, comprising:
    first plate means having a first outer peripheral surface for receiving a load to be weighed;
    a second plate means having a second outer peripheral surface, disposed below the first plate means; and
    at least one compression spring means for maintaining a separation between said first and second plate means, said spring means attached to said first and second plate means and not extending beyond said first or second outer peripheral surface in any dimension, said spring means being compressible along a direction substantially perpendicular to the plate means and said spring means comprising wrinkle means, said spring means allowing said first plate means to move toward and away from said second plate means while preventing all but minimal lateral shifting of said first and second plate means.

5. A measuring apparatus for masses and forces, comprising:
    first plate means having a first outer peripheral surface for receiving a load to be weighed;
    a second plate means having a second outer peripheral surface, disposed below the first plate means; and
    at least one compression spring means for maintaining a separation between said first and second plate means, said spring means attached to said first and second plate means and not extending beyond said first or second outer peripheral surface in any dimension, said spring means having a generally conic cross-section and said spring means allowing said first plate means to move toward and away from said second plate means while preventing all but minimal lateral shifting of said first and second plate means.

6. A measuring apparatus for masses and forces, comprising:
   first plate means having a first outer peripheral surface for receiving a load to be weighed;
   a second plate means having a second outer peripheral surface, disposed below the first plate means; and
   at least one compression spring means for maintaining a separation between said first and second plate means, said spring means attached to said first and second plate means and not extending beyond said first or second outer peripheral surface in any dimension, said spring means having a generally frusto-conic cross-section and said spring means allowing said first plate means to move toward and away from said second plate means while preventing all but minimal lateral shifting of said first and second plate means.

7. A measuring apparatus for masses and forces, comprising:
   first plate means having a first outer peripheral surface for receiving a load to be weighed;
   a second plate means having a second outer peripheral surface, disposed below the first plate means; and
   at least one compression spring means for maintaining a separation between said first and second plate means, said spring means attached to said first and second plate means and not extending beyond said first or second outer peripheral surface in any dimension, said spring means allowing said first plate means to move toward and away from said second plate means while preventing all but minimal lateral sifting of said first and second plate means;
   means for attaching the spring means to at least one of the upper and lower plate means to define a volume between the plate means and the spring means.

8. The measuring apparatus of claim 7 wherein the spring means includes at least one hole means for allowing air pressure to escape from the volume when the spring means is compressed.

9. The measuring apparatus of claim 8 wherein the spring means includes a plurality of springs substantially disposed about a first axis passing through the upper and lower plate means with the springs disposed between the first and second plate means.

10. The measuring apparatus of claim 7 wherein the spring means comprises a toroid-shaped spring means attached along an outer peripheral surface of the upper plate means and along an outer peripheral surface of the lower plate means to define a volume between the plate means and the spring means.

11. The measuring apparatus of claim 10 wherein the spring means includes at least one hole means for allowing air pressure to escape from the volume when the spring means is compressed.

12. Self-adjusting weighing system, comprising, first plate means having an outer peripheral edge and including means for receiving a load to be weighed, a second plate means having an outer peripheral edge, said second plate means disposed adjacent to the first plate means defining a gap between said plate means, spring means for maintaining said gap between the first and second plate means and for preventing all but minimal lateral shifting of said first and second plate means, said spring means comprising a plurality of springs disposed about a central axis of said first and second plate means, each of said plurality of springs having a generally conic cross-section and two sides, means for securing each of said sides of the spring means to respective first and second plate means, and means for securing disposed within the outer peripheral edge of respective first and second plate means.

13. The self-adjusting weighing system of claim 12 wherein said plural springs each have groove means for enabling expansion and contraction of each spring upon experiencing relative movement between said first and second plate means.

14. Self-adjusting weighing system, comprising, first plate means having an outer peripheral edge and including means for receiving a load to be weighed, a second plate means having an outer peripheral edge, said second plate means disposed adjacent to the first plate means defining a gap between said plate means, spring means for maintaining said gap between the first and second plate means and for preventing all but minimal lateral shifting of said first and second plate means, said spring means comprises an annular shaped spring having a generally frusto-conic cross-section and two sides, means for securing each of said sides of the spring means to respective first and second plate means, said means for securing disposed within the outer peripheral edge of respective first and second plate means.

15. A measuring apparatus for masses and forces, comprising:
   a first plate means having a first facing surface oriented parallel to a first direction;
   a second plate means having a second facing surface oriented parallel to the first direction and spaced from the first plate means to define a gap between the first facing surface of the first plate means and the second facing surface of the second plate means;
   spring means attached to the respective facing surface of the first plate means and the second plate means, said spring means maintaining the gap between said first and second plate means; and
   the spring means including means for controlling motion of the first and second plate means to move substantially perpendicular to the first direction without substantial movement parallel to the first direction, said controlling means comprises wrinkles in the spring means.

16. A measuring apparatus for masses and forces, comprising:
   a first plate means having a first facing surface oriented parallel to a first direction;
   a second plate means having a second facing surface oriented parallel to the first direction and spaced from the first plate means to define a gap between the first facing surface of the first plate means and the second facing surface of the second plate means;
   spring means attached to the respective facing surface of the first plate means and the second plate means, said spring means maintaining the gap between said first and second plate means; and the spring means including means for controlling motion of the first and second plate means to move substantially perpendicular to the first direction without substantial movement parallel to the first direction, said controlling means includes corrugations in the spring means.

17. A measuring apparatus for masses and forces, comprising:
- a first plate means having a first facing surface oriented parallel to a first direction;
- a second plate means having a second facing surface oriented parallel to the first direction and spaced from the first plate means to define a gap between the first facing surface of the first plate means and the second facing surface of the second plate means;
- spring means attached to the respective facing surface of the first plate means and the second plate means, said spring means maintaining the gap between said first and second plate means; and
- the spring means including means for controlling motion of the first and second plate means to move substantially perpendicular to the first direction without substantial movement parallel to the first direction, said controlling means includes at least one groove means in the spring means.

* * * * *